United States Patent
Kamigaito et al.

(10) Patent No.: US 10,007,029 B2
(45) Date of Patent: Jun. 26, 2018

(54) β-PHELLANDRENE POLYMER, PRODUCTION METHOD FOR SAME, AND MOLDED ARTICLE

(71) Applicants: NATIONAL UNIVERSITY CORPORATION NAGOYA UNIVERSITY, Aichi (JP); SEKISUI CHEMICAL CO., LTD., Osaka (JP)

(72) Inventors: Masami Kamigaito, Nagoya (JP); Kotaro Satoh, Nagoya (JP); Shinya Suzuki, Nagoya (JP); Yasuyuki Kori, Isesaki (JP); Yuji Eguchi, Tsukuba (JP); Koichiro Iwasa, Tokyo (JP); Hitoshi Shirato, Tsukuba (JP)

(73) Assignees: NATIONAL UNIVERSITY CORPORATION NAGOYA UNIVERSITY, Aichi (JP); SEKISUI CHEMICAL CO., LTD., Osaka (JP)

(*) Notice: Subject to any disclaimer, the term of this patent is extended or adjusted under 35 U.S.C. 154(b) by 80 days.

(21) Appl. No.: 15/029,355

(22) PCT Filed: Oct. 21, 2014

(86) PCT No.: PCT/JP2014/077979
§ 371 (c)(1),
(2) Date: Apr. 14, 2016

(87) PCT Pub. No.: WO2015/060310
PCT Pub. Date: Apr. 30, 2015

(65) Prior Publication Data
US 2016/0223715 A1    Aug. 4, 2016

(30) Foreign Application Priority Data

Oct. 21, 2013 (JP) ................... 2013-218510
Mar. 24, 2014 (JP) ................... 2014-060269
Mar. 24, 2014 (JP) ................... 2014-060270

(51) Int. Cl.
*C09D 11/10* (2014.01)
*G02B 1/04* (2006.01)
(Continued)

(52) U.S. Cl.
CPC ............. *G02B 1/041* (2013.01); *C08F 8/04* (2013.01); *C08F 36/04* (2013.01); *C08F 132/06* (2013.01)

(58) Field of Classification Search
CPC .......... C08F 36/04; C08F 8/04; C08F 132/06; G02B 1/041
USPC ......... 260/80.78; 526/238.3; 530/214, 219.6, 530/232.1, 232
See application file for complete search history.

(56) References Cited

U.S. PATENT DOCUMENTS

| 3,510,461 A | 5/1970 | Davis |
| 4,975,503 A * | 12/1990 | Parker .................. C08F 212/12 |
| | | 526/219.6 |
| 2014/0171589 A1 | 6/2014 | Wosnick et al. |

FOREIGN PATENT DOCUMENTS

| CN | 101522731 | 5/2011 |
| CN | 102382221 | 3/2012 |

(Continued)

OTHER PUBLICATIONS

Office Action dated Apr. 17, 2017 in corresponding Chinese Application No. 201480057461.0, with English translation.

(Continued)

*Primary Examiner* — William K Cheung
(74) *Attorney, Agent, or Firm* — Wenderoth, Lind & Ponack, L.L.P.

(57) ABSTRACT

[1] A β-phellandrene polymer which is a polymerization product of β-phellandrene. [2] The β-phellandrene polymer comprising β-phellandrene units represented by chemical formulae (I-1), (I-2), (II-1) and (II-2), a total amount of the β-phellandrene units being 50% by mass or more. [3] The β-phellandrene polymer, which has a number average molecular weight Mn of 40,000 or more. [4] The β-phellandrene polymer, wherein at least a part of olefinic carbon-carbon double bonds thereof are hydrogenated. [5] The β-phellandrene polymer, which has a glass transition temperature of 80° C. or more.

[Chemical Formula 1]

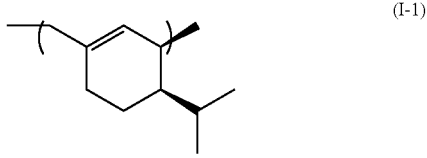

(I-1)

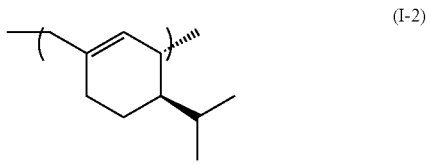

(I-2)

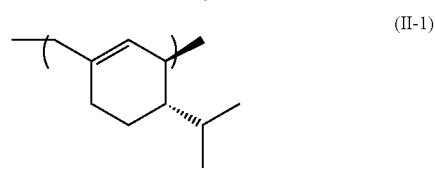

(II-1)

(Continued)

-continued

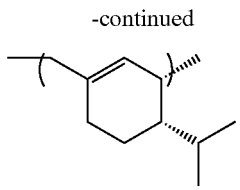

(II-2)

20 Claims, No Drawings

(51) Int. Cl.
  *C08F 36/04* (2006.01)
  *C08F 8/04* (2006.01)
  *C08F 132/06* (2006.01)

(56) References Cited

FOREIGN PATENT DOCUMENTS

| CN | 102964495 | 3/2013 |
|----|-----------|--------|
| EP | 0 083 157 | 7/1983 |
| EP | 1197509 | 4/2002 |
| JP | 58-118250 | 7/1983 |
| JP | 60-152577 | 8/1985 |
| JP | 6343910 | 2/1988 |
| JP | 2000-221328 | 8/2000 |
| JP | 2008-50501 | 3/2008 |
| JP | 4183283 | 11/2008 |
| JP | 2010-535257 | 11/2010 |
| JP | 5275633 | 8/2013 |
| JP | 2014-76042 | 5/2014 |
| JP | 2014-118562 | 6/2014 |
| JP | 6145937 | 6/2017 |
| WO | 00/73366 | 12/2000 |
| WO | 2009/016083 | 2/2009 |

OTHER PUBLICATIONS

International Search Report dated Jan. 13, 2015 in International (PCT) Application No. PCT/JP2014/077979.

Findley et al., "A stereoselective, Sm(II)-mediated approach to decorated cis-hydrindanes: synthetic studies on faurinone and pleuromutilin", Org. Biomol. Chem., vol. 9, 2011, pp. 2433-2451.

Office Action dated Jan. 9, 2018 in Japanese Patent Application No. 2017-054938, with English translation.

* cited by examiner

β-PHELLANDRENE POLYMER, PRODUCTION METHOD FOR SAME, AND MOLDED ARTICLE

This application is a national stage application filed under 35 USC § 371 of International Application No. PCT/JP2014/077979, filed Oct. 21, 2014, which claims the benefit of priority from Japan Patent Application No. 2014-060270 filed Mar. 24, 2014, Japan Patent Application No. 2013-218510 filed Oct. 21, 2013, and Japan Patent Application No. 2014-060269 filed Mar. 24, 2014, the entire contents of each of which are incorporated by reference herein as if set forth in their entireties.

TECHNICAL FIELD

The present invention relates to a β-phellandrene polymer, a production method thereof, and a molded article thereof.

This application claims priority from Japanese Patent Application No. 2013-218510 filed on Oct. 21, 2013, Japanese Patent Application No. 2014-060269 filed on Mar. 24, 2014, and Japanese Patent Application No. 2014-060270 filed on Mar. 24, 2014, the contents of which are incorporated herein by reference.

BACKGROUND ART

In resent years, demands placed on resins for optical use (optical resins) are getting higher and higher, where the resins having heat resistance and high transparency are demanded. However, conventional optical resins have various disadvantages. For example, poly(methyl methacrylate) has excellent optical properties, such as high transparency and small birefringence, but has a disadvantage of low heat resistance. In contrast, as a method for producing an optical resin with high heat resistance and excellent transparency, for example, Patent Document 1 proposes a method for producing a hydrogenation product of a polymer formed by ring-opening polymerization of a cyclic olefin, which includes ring-opening metathesis polymerization of a cyclic olefin derived from petroleum, followed by hydrogenation of the resulting product. Patent Document 2 proposes a method for producing cycloolefin copolymers, each being an alicyclic hydrocarbon type copolymer, which includes copolymerizing a cycloolefin and a linear olefin in the presence of a certain catalyst.

PRIOR ART DOCUMENTS

Patent Documents

Patent Document 1: PCT International Publication No. WO 00/73366
Patent Document 2: Japanese Patent No. 4183283
Patent Document 3: Japanese Patent No. 5275633

DISCLOSURE OF INVENTION

Problems to be Solved by the Invention

However, the monomer used as a material for the alicyclic hydrocarbon-based polymer is derived from petroleum, and therefore is not a carbon-neutral material capable of suppressing carbon dioxide emission. As a carbon-neutral material for the polymer, a compound which can be produced in a biosynthetic pathway in an organism is attracting attention. For example, a polymer having a glass transition point of 80 obtained by polymerizing β-pinene derived from terpene oil extracted from pine or the like is proposed (Patent Document 3). However, to obtain a polymer with such a high polymerization degree that the polymer exhibits strength as required in practice by polymerization of β-pinene monomers, it is necessary to polymerize the monomers in the presence of a bifunctional vinyl compound. In addition, it is necessary to set the polymerization temperature at an extremely low level, i.e., −80° C. to 0° C. The use of natural materials with good polymerization characteristics has been desired for reducing the environmental load and producing polymers at low cost.

The present invention has been made in view of the above circumstances and provides: β-phellandrene polymer with good optical properties and heat resistance, which is a polymer of β-phellandrene monomers obtainable from microorganisms or plants as carbon-neutral material and having particularly good polymerization properties; a production method therefor; and a molded article of the β-phellandrene polymer.

Means for Solving the Problems

[1] A β-phellandrene polymer which is a polymerization product of at least one of β-phellandrene compounds represented by chemical formulae (I) and (II).

Chemical Formula 1

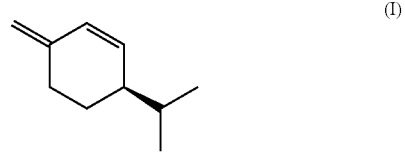

(I)

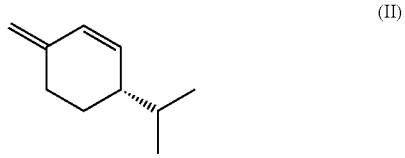

(II)

[2] A molded article comprising the β-phellandrene polymer according to [1], the amount of the β-phellandrene polymer being 50% by mass or more, based on the total mass of the molded article.

Effects of the Invention

The β-phellandrene of the present invention has a small specific gravity, which, therefore, is useful as a material for a light weight molded article which excels in heat resistance and light transmittance. According to the method for producing β-phellandrene polymer of the present invention, it is possible to obtain a β-phellandrene polymer of a high polymerization degree, which excels in heat resistance and light transmittance.

MODE FOR CARRYING OUT THE INVENTION

The first embodiment of the present invention is a β-phellandrene polymer. The second embodiment of the present invention is a method for producing a β-phellandrene polymer. The third embodiment of the present invention is a molded article of β-phellandrene.

<Method for Producing a β-phellandrene polymer>

β-phellandrene, which is a monomer constituting a β-phellandrene polymer, may be obtained by extraction and purification from living organisms or chemical synthesis from petroleum-derived compounds. More specifically, for example, it is possible to use β-phellandrene contained in essential oil obtained from plant seeds or roots by steam distillation, or β-phellandrene obtained by known chemical synthesis methods with using known chemical substances as raw materials.

For example, in the case of using the known chemical substances as raw materials, it is possible to use β-phellandrene obtained by a known chemical synthesis method where the β-phellandrene is synthesized via Crypron from 4-isopropylcyclohexanone as a starting material
(Organic & Biomolecular Chemistry, 9 (7), 2433-2451, 2011).

In the case of using the chemical substances extracted from living organisms, the extract of the leaves and seeds of the plants containing β-phellandrene can be used after purification. Examples of such plants include Sakhalin fir, ginger, fennel, neroli, rosewood, tomatoes, lavender, Canada balsam, and Angelica. In particular, it is preferable to use a high-purity β-phellandrene, in which case it is possible to increase the purity (pure content) by a method such as precision distillation or separation using a silica gel column.

By using β-phellandrene derived from living organisms as the carbon neutral material, the environmental load caused during the production process and the carbon dioxide emission can be reduced.

For achieving the increase in the number average molecular weight Mn of the β-phellandrene polymer; the increase in the glass transition temperature Tg relating to heat resistance; excellent light transmittance, heat resistance and mechanical strength; and the easiness of molding, it is preferable to make the purity of β-phellandrene in the reaction solution containing β-phellandrene as high as possible in a reaction system for synthesizing the β-phellandrene polymer. Further, the reaction system is more preferably a reaction system from which the compounds having a double bond that interferes with the polymerization of β-phellandrene are removed as much as possible.

As an especially preferable method for increasing the purity of β-phellandrene, there can be mentioned a method including adding a substance which reacts with the conjugated double bond of the cis form of Diels-Alder reagent or the like, removing the substance having a conjugated double bond of the cis form other than β-phellandrene as an insoluble substance, and further performing the separation by precision distillation, silica gel column or the like.

Specifically, the amount of β-phellandrene compounds represented by the following chemical formulae (I) and (II) in the reaction solution based on the total weight of the polymerizable compounds present in the reaction solution, i.e. the purity of β-phellandrene, is preferably 50% by mass or more, more preferably 70% by mass or more, even more preferably 80% by mass or more, further more preferably 90% by mass or more, most preferably 95% by mass or more. The amount of β-phellandrene compounds may be 100% by mass. Here, the "purity" does not mean an optical purity which distinguishes the optical isomers of β-phellandrene from each other, but means a mere chemical purity which does not distinguish the optical isomers of β-phellandrene from each other. The "polymerizable compound" means a compound having a double bond polymerizable with β-phellandrene.

In the present specification and claims, the purity of β-phellandrene used in the aforementioned reaction is measured by the gas chromatography (GC) method or the GC-MS method, and determined by the peak area percentage of β-phellandrene.

For example, the purity can be determined by a gas chromatograph analyzer using a reaction solution containing the β-phellandrene which has been diluted with chloroform to a concentration of 1% by mass.

A desired β-phellandrene polymer can be obtained by a method in which a Lewis acid as a catalyst is added to and finely dispersed in an organic solvent constituting the aforementioned reaction solution, followed by gradual dropwise addition of a high purity β-phellandrene to initiate a cationic polymerization reaction, and the polymerization reaction is implemented for a predetermined period of time.

When the cationic polymerization is carried out by such a solution polymerization method, the amount of β-phellandrene as a monomer based on the total weight of the reaction solution is preferably adjusted to 1 to 90% by mass, more preferably 10 to 80% by mass, further more preferably 10 to 50% by mass. When the amount of β-phellandrene is less than 1% by mass, the productivity of the β-phellandrene polymer is low, and when the amount of β-phellandrene is more than 90% by mass, the removal of the polymerization heat becomes difficult.

Type of the organic solvent constituting the reaction solution is not particularly limited as long as it is capable of dissolving β-phellandrene therein, and any solvents used in conventional cationic polymerization can be used as the organic solvent. Among them, solvents with less chain transfer effect are preferable. As examples of such solvents, from the viewpoint of solubility and reactivity under the polymerization conditions of the polymer, there can be mentioned halogenated hydrocarbons, aromatic hydrocarbons, aliphatic hydrocarbons and the like. More specific examples of the solvent include halogenated hydrocarbon solvents such as methylene chloride, chloroform, 1, 1-dichloroethane, 1,2-dichloroethane, n-propyl chloride, 1-chloro-n-butane, and 2-chloro-n-butane; aromatic hydrocarbon solvents such as benzene, toluene, xylene, and anisole; aliphatic hydrocarbon solvents such as pentane, hexane, heptane, octane, cyclopentane, cyclohexane, methylcyclohexane, ethylcyclohexane, and decalin.

As the organic solvent, one organic solvent alone and two or more organic solvents in combination can be used.

The organic solvent can be a non-polar solvent or a polar solvent.

It is particularly preferable to use a non-polar solvent in order to obtain a polymer with high toughness by further increasing the polymerization degree of the β-phellandrene polymer.

As the Lewis acid, a Lewis acid used in conventional cationic polymerization can be used. From the viewpoint of high reactivity and selectivity, for example, it is preferable to use $EtAlCl_2$, $AlCl_3$, $Et_2AlCl$, $Et_3Al_2Cl_3$, $BCl_3$, $SnCl_4$, $TiCl_4$, and $Ti(OR)_{4-y}Cl_4$, wherein R represents an alkyl group or an aryl group, and y is an integer of 1 to 3. Further examples of the Lewis acid include metal halide such as $BF_3$, $BBr_3$, $AlF_3$, $AlBr_3$, $TiBr_4$, $TiI_4$, $FeCl_3$, $FeCl_2$, $SnCl_2$, $WCl_6$, $MoCl_5$, $SbCl_5$, $TeCl_2$, and $ZnCl_2$; metal alkyl compounds such as $(i-Bu)_3Al$, $(i-Bu)_2AlCl$, $(i-Bu)AlCl_2$, $Me_4Sn$, $Et_4Sn$, $Bu_4Sn$, and $Bu_3SnCl$, wherein Me represents a methyl group, Et represents an ethyl group, and Bu represents a butyl group; and metal alkoxy compounds such as Al $(OR)_{3-x}Cl_x$, wherein R represents an alkyl group or an aryl group, x is an integer of 1 or 2.

Each of the aforementioned Lewis acids may be used individually, or two or more of the Lewis acids may be used in combination.

As the polymerization catalyst, the Lewis acid described above can be used alone, or may be used in combination with an initiator usable with the Lewis acid. In this case, the initiator is a substance that generates a carbocation by reacting with the Lewis acid, and any initiator having such a property can be used. Specific examples include chlorine-based initiators such as alkyl vinyl ether-hydrogen chloride adduct, chloro alkyl vinyl ether-hydrogen chloride adduct, α-chloroethylbenzene, α-chloro-isopropyl benzene, 1,3-bis(α-chloro-isopropyl)benzene, 1,4-bis(α-chloro-isopropyl)benzene, 1,3-bis(α-chloro-isopropyl)-5-t-butyl benzene, 1,3,5-tris(α-chloro-isopropyl)benzene, t-butyl chloride, and 2-chloro-2,4,4-trimethyl pentane; ester-based initiator such as alkyl vinyl ether-acetic acid adduct, α-acetoxy ethylbenzene, α-acetoxy isopropyl benzene, 1,3-bis(α-acetoxymethyl isopropyl)benzene, 1,4-bis(α-acetoxy isopropyl)benzene; and alcohol-based initiator such as α-hydroxy ethyl benzene, α-hydroxy isopropyl benzene, 1,3-bis(α-hydroxy isopropyl)benzene, and 1,4-bis(α-hydroxy isopropyl)benzene.

The electron donor agent used in conjunction with a living cationic polymerization catalyst also can be used. As such electron donor agent, it is possible to use any of known electron donor agents. Specific examples include ethers such as diethyl ether, methyl-t-butyl ether, and dibutyl ether; esters such as ethyl acetate, methyl acetate, isopropyl acetate, butyl acetate, methyl isobutyrate, ethyl isobutyrate, and propyl isobutyrate; pyridines such as pyridine, 2-methyl pyridine, 2,6-dimethyl-pyridine, 2,6-di-butyl pyridine, 2,6-diphenyl-pyridine, 2,6-di-t-butyl pyridine, and 2,6-di-t-butyl-4-methylpyridines; amines such as trimethylamine, triethylamine, and tributylamine; amide such as dimethylacetamide, and diethyl acetamide; and sulfoxides such as dimethyl sulfoxide. In particular, diethyl ether or ethyl acetate or the like is preferably used because of its economical advantage and the easiness of the removal thereof after the reaction.

The concentration of these Lewis acids in the reaction solution, based on 100 parts by mass of the β-phellandrene to be added later, is preferably 0.001 to 100 parts by mass, more preferably 0.01 to 50 parts by mass, and further more preferably 0.1 to 10 parts by mass. When the amount of Lewis acid catalyst used is too small, the reaction may be terminated before the completion of the polymerization, while the use of Lewis acid catalyst in too large an amount is economically disadvantageous.

The β-phellandrene to be dropwise added can be dissolved beforehand in an organic solvent of the same type as the organic solvent constituting the reaction liquid. In general, the temperature of the reaction solution at the time of the dropwise addition can be set to −120° C. to 150° C., and preferably set to −90° C. to 100° C. When the reaction temperature is too high, the control of the reaction becomes difficult and the stable reaction result reproductivity becomes to be difficult to obtain, and when the reaction temperature is too low, the production cost becomes high.

In the method for producing β-phellandrene polymer, the reaction is preferred to be performed at a low temperature for increasing the degree of polymerization. For example, by performing the reaction at −80° C. to 70° C., the β-phellandrene polymer having a number average molecular weight Mn of 100,000 or more, for example, an Mn of 140,000, can be easily obtained. The reaction may be performed at −15 to 40° C., in which case the β-phellandrene polymer with a number average molecular weight Mn of around 50,000 to 100,000 can be easily obtained.

The reaction time of cationic polymerization is not particularly limited, and may be appropriately adjusted depending on conditions such as the kind and amount of polymerization catalyst, the reaction temperature, and the reaction equipment, such that a β-phellandrene polymer having desired properties can be obtained. In general, a β-phellandrene polymer having desired properties can be obtained by performing the reaction for 1 second to 100 hours, preferably 10 seconds to 1 hour, more preferably 30 seconds to 10 minutes. It is preferable to polymerize the β-phellandrenes until the number average molecular weight Mn of the β-phellandrene polymer reaches 40,000 or more. After the cationic polymerization, it is preferable to hydrogenate at least a part of the olefinic carbon-carbon double bonds of the obtained polymer.

The β-phellandrene polymer of the first embodiment may be a homopolymer of β-phellandrene or a copolymer of β-phellandrene with one or more other monomers copolymerizable with β-phellandrene.

To terminate the polymerization reaction, a polymerization terminator may be added after a predetermined time of reaction. As the polymerization terminator, for example, alcohols such as methanol and ethanol can be suitably used. The amount of the polymerization terminator to be added is not strictly limited, but is generally from 0.01 to 10 times the volume of the reaction solvent.

As the method for separating the β-phellandrene polymer obtained by the polymerization in the reaction solution from the solvent, a known method can be used, such as re-precipitation, distillation of the solvent by heating, removal of the solvent under a reduced pressure, removal of the solvent by water vapor (coagulation), and degassing solvent removal by an extruder.

When neutralizing and removing a chlorine-based Lewis acid catalyst in separating the polymer from the solvent, a known neutralizing agent can be used, such as an alkaline neutralizing agent, for example, sodium hydroxide, sodium hydrogen carbonate, and ammonia. There is no particular limitation with respect to the type of neutralizing agent. When the β-phellandrene polymer is for the use where further improvements of transparency and thermal stability are demanded, it is desired to sufficiently remove chlorine and neutralized salt remaining as impurities in the obtained polymer. The removal method is not particularly limited, but as an example of preferable method, there can be mentioned a removal method wherein the purification is effected by a treatment such as timely addition of water during the reprecipitation of the polymer. Particularly, in order to improve the optical properties and electrical insulating properties, the amount of the residual neutralized salt in the polymer is preferably 100 ppm or less, more preferably 10 ppm or less, based on the mass of the polymer.

<β-phellandrene polymer>

The number average molecular weight Mn of the β-phellandrene polymer is preferably from 10,000 to 1,000,000, more preferably 40,000 or more, from the viewpoint of viscosity and melt viscosity of the polymerization solution, moldability, strength and heat resistance of a molded article. The β-phellandrene polymer of the first embodiment of the present invention can be prepared to have a number average molecular weight Mn within any of the following ranges: from 20,000 to 500,000, from 30,000 to 400,000, from 40,000 to 300,000, from 50,000 to 250,000, from 60,000 to 200,000, from 70,000 to 150,000, and from 80,000 to 120,000. If the molecular weight of the polymer is too large, the viscosity of the polymerization solution may become too high so that the productivity of the polymer is deteriorated, or the melt viscosity of the polymer may become too high so that the moldability is deteriorated. On the other hand, if the molecular weight of the polymer is too small, the strength of the molded article obtained by using the polymer may decrease, and the glass transition temperature may decrease to lower than 80° C. so that a sufficient heat resistance cannot be obtained.

The larger the weight average molecular weight Mw of the β-phellandrene polymer, the more preferable from the viewpoint of improving the mechanical strength, heat resistance, and moldability of the molded article. Specifically, the Mw is preferably 50,000 or more, more preferably 70,000 or more, further more preferably 90,000 or more, still more preferably 110,000 or more, even more preferably 130,000 or more, and most preferably 150,000 or more. Although the upper limit of the weight average molecular weight Mw of the β-phellandrene polymer is not particularly limited, from the viewpoint of improving the moldability and processability, in general, the Mw is preferably 1,000,000 or less, more preferably 800,000 or less, still more preferably 600,000 or less. The weight average molecular weight can be calculated from the measured data obtained in the same manner as in the case of the number average molecular weight.

For the same reason as described above, the Mw/Mn of the β-phellandrene polymer is preferably 1 to 25, more preferably 1.05 to 20, further more preferably 1.1 to 10.

The glass transition temperature Tg of β-phellandrene polymer is, from the view point of heat resistance, moldability, and strength of the molded article, preferably 80° C. or more, more preferably about 80to 350° C., further more preferably 85to 250° C., even more preferably 90 to 200 ° C. When the glass transition temperature Tg is too high, the melt viscosity of the β-phellandrene polymer may become too high so that the moldability becomes poor. On the other hand, too low a glass transition temperature Tg is not suitable for practical use because the heat resistant temperature for use of the molded article becomes low. Generally, by increasing the molecular weight of β-phellandrene polymer and by hydrogenating β-phellandrene polymer, the glass transition temperature Tg and heat resistance of the polymer can be improved.

In the present specification and claims, the number average molecular weight Mn and the weight average molecular weight Mw of the β-phellandrene polymer are obtained according to the procedure of size-exclusion chromatography as prescribed in JIS-K-0124-2002, and are determined from the value of the differential refractometer detector measured by GPC and a calibration curve of standard polystyrene. The glass transition temperature Tg is determined according to the procedure prescribed in JIS-K-7121-1987 "transition temperature measuring method for plastics". More specifically, the glass transition temperature Tg in the specification and claims is the temperature determined as the intermediate point glass transition temperature ($T_{mg}$) in this method.

<Regarding optical isomers of β-phellandrene>

The β-phellandrene used as the material for the β-phellandrene polymer of the first embodiment of the present invention may be: a mixture of the compounds which are mutually optical isomers (enantiomers) represented by the following chemical formulae (I) and (II); a racemic compound thereof; or either one of the optical isomers. The chemically synthesized β-phellandrene is generally the aforementioned mixture or racemic compound. In the case of using a β-phellandrene material including only one type of optical isomer, for example, a material can be used which is obtained by the optical isomer separation using techniques such as chromatography using chiral columns or diastereomer method using an optical resolution agent.

Chemical Formula 2

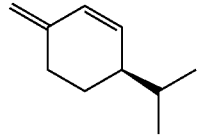
(I)

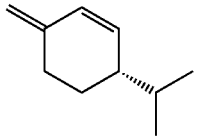
(II)

The β-phellandrene polymer, which has been obtained by using, as a raw material, the mixture or the racemic compound of β-phellandrene compounds, comprises one or more types of monomer units (repeating units) represented by the following general formulae (I-1), (I-2), (II-1) and (II-2). In the chemical formulae, each parenthesis represents a bond between mutually adjacent monomer units which are polymerized (or linked).

Chemical Formula 3

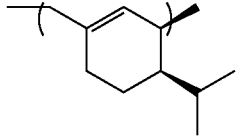
(I-1)

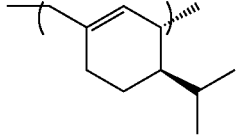
(I-2)

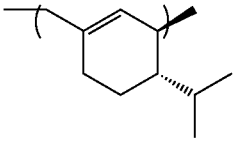
(II-1)

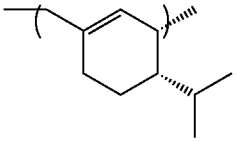
(II-2)

With respect to the monomer units represented by the above-mentioned chemical formulae, the β-phellandrene polymer of the first embodiment of the present invention may contain only one type of the monomer units, two types of the monomer units, three types of the monomer units or four types of the monomer units.

In the β-phellandrene polymer of the first embodiment of the present invention, when obtained using a mixture of Formulae (I) and (II) as the material thereof, the β-phellandrene units represented by above formula (I-1), (I-2), (II-1) and (II-2) are thought to be contained in a total amount of 50% by mass or more based on the total mass of the β-phellandrene polymer. This total amount is preferably 50 to 100% by mass, more preferably 70 to 100% by mass, further more preferably 80 to 100% by mass, and most preferably 90 to 100% by mass.

<Hydrogenation of β-phellandrene polymer>

At least a part of the olefinic carbon-carbon double bonds of β-phellandrene polymer of the first embodiment of the present invention may be hydrogenated (namely, hydrogen addition may be performed). The hydrogenation increases the glass transition temperature Tg, so that a polymer with further improved heat resistance can be obtained.

As the method for hydrogenation of the β-phellandrene polymer of the first embodiment of the present invention, a conventionally known method for adding hydrogen to polymers is applicable. As the hydrogenation catalyst that can be used in this case, any catalysts generally used for the hydrogenation reaction of olefins or aromatic compounds can be used, examples of which include a supported metal catalyst formed by supporting a transition metal such as palladium, platinum, nickel, rhodium or ruthenium on a carrier such as carbon, alumina, silica or diatomaceous earth; a homogeneous catalyst comprising an organotransition metal compound of titanium, cobalt, nickel or the like and an organometal compound of lithium, magnesium, aluminum, tin or the like; and a metal complex catalyst containing rhodium, ruthenium or the like.

Of the catalysts used for the hydrogenation reaction illustrated here, the supported metal catalyst is particularly preferable since it can be easily separated and recovered by filtration together with the polymerization catalyst after the hydrogenation reaction. Each of the aforementioned catalysts may be used individually, or two or more of the catalysts may be used in combination.

The hydrogenation can be usually performed at a reaction temperature of −20° C. to 250° C.

The hydrogen pressure in performing the hydrogenation may be usually 0.1 to 100 kgf/cm², wherein 1 kgf=9.8N.

Regarding a solvent used for performing the hydrogenation, there is no particular limitation as long as it is an organic solvent in which the polymer can be dissolved and which is inert to the catalyst. From the viewpoint of solubility and reactivity of a hydrogenated product of the polymer, for example, aliphatic hydrocarbons, halogenated hydrocarbons, aromatic hydrocarbons and the like can be mentioned as examples of usable solvent. Each of the aforementioned organic solvents may be used individually, or two or more of the organic solvents may be used in combination.

The hydrogenation also can be carried out in situ after the polymerization reaction of the β-phellandrene without exchanging the solvent of the reaction solution. Thus performing the hydrogenation without exchanging the solvent is preferable from the viewpoint of reducing the environmental load, since the waste liquid resulting from the production process can be reduced thereby.

The reaction can be usually carried out for about 0.1 to 20 hours. By performing the hydrogenation of the β-phellandrene polymer, it becomes possible to obtain a polymer which excels in heat resistance, light resistance, chemical resistance and the like.

In the present specification and claims, the hydrogenation ratio of the olefinic carbon-carbon double bonds of β-phellandrene polymer is calculated by using the measured values in nuclear magnetic resonance spectrum ($^1$H-NMR spectrum) obtained using deuterated chloroform as a solvent. Specifically, the ratio of the integrated value A to the integrated value B (A/B) is calculated, the integrated value A being calculated by integrating the signal detected at δ=5.0 to 6.0 ppm, i.e., the signal ascribed to the proton of the olefinic carbon—carbon double bond, and the integrated value B being calculated by integrating the signal detected at 0.5 to 2.5 ppm, i.e., the signal ascribed to the proton of saturated hydrocarbons, wherein the position of the peak ascribed to the proton of tetramethylsilane is set at 0 ppm. This ratio decreases as the hydrogenation ratio increases. The hydrogenation ratio can be determined by calculating each of the ratio before the hydrogenation (A/B (before the hydrogenation)) and the ratio after the hydrogenation (A/B (after the hydrogenation)) and substituting the obtained values into the following formula.

Hydrogenation ratio (%)=(ratio (*A/B* (before the hydrogenation))−ratio (*A/B* (after the hydrogenation))×100/ratio (*A/B* (before the hydrogenation))

The glass transition temperature Tg of the polymer obtained by hydrogenating the β-phellandrene polymer is preferably about 80 to 350° C., more preferably about 85 to 250° C., and further more preferably 90 to 200° C. from the viewpoint of heat resistance, moldability, and the strength of the molded product.

<Molded Article>

The β-phellandrene polymer the first embodiment of the present invention and the hydrogenation product thereof have a thermoplasticity, and therefore can be molded by press molding, extrusion molding, injection molding and the like.

If necessary, a predetermined amount of an optional component may be blended into the molded article of the third embodiment of the present invention during the molding. Examples of the optional component include various additives such as stabilizers, lubricants, pigments, impact modifiers, processing aids, reinforcing agents, colorants, flame retardants, weatherability improvers, ultraviolet absorbers, antioxidants, antifungal agents, antibacterial agents, light stabilizers, antistatic agents, silicone oils, anti-blocking agents, releasing agents, foaming agents, fragrance additives and the like; fibers such as glass fibers, polyester fibers and the like; fillers such as talc, mica, montmorillonite, silica, wood flour and the like; and various coupling agents.

By molding the β-phellandrene polymer of the first embodiment of the present invention or the hydrogenation product thereof, it becomes possible to obtain a molded article having a low specific gravity, which excels in transparency and heat resistance. Specifically, it becomes possible to obtain a molded article which has a total light transmittance of 80% or more, preferably 90% or more, more preferably 95% or more, and a glass transition temperature Tg of 80° C. or more. The upper limit of the glass transition temperature Tg of the molded article is usually the same as the upper limit of Tg of the polymer constituting the molded article.

The use of the molded article is not particularly limited, and the molded article is applicable to various uses as in the case of the conventional transparent resins.

The amount of the β-phellandrene polymer of the first embodiment contained in the molded article is preferably 50% by mass or more, based on the total weight of the molded article. The molded article can be made to reflect the excellent properties possessed by the β-phellandrene polymer.

<Regarding the Molded Article Using β-phellandrene polymer>

Examples of the molded article include plastic films for optical use, plastic lenses, and the like.

<Regarding Tg of β-phellandrene polymer used for various molded articles>

When the molded article is supposed to be used at a location close to a heat source (for example, a light source which emits heat), and from the viewpoint of easiness in surface processing, the glass transition temperature Tg of the polymer obtained by hydrogenation of the β-phellandrene polymer is preferably higher. From the viewpoint of reducing the influence caused by the heat from the light source, the Tg is more preferably 100° C. or more. The molded article may be subjected to a surface processing (surface treatment) by a known method in order to improve the solvent resistance or gas barrier property of the molded article, or to impart the molded article with antistatic property or conductivity. Since the surface processing can be performed easily, the Tg of the hydrogenated β-phellandrene polymer is preferably 120° C. or more. If the Tg exceeds about 200° C., the melt viscosity of the β-phellandrene polymer becomes high, whereby the moldability may become worse. On the other hand, the Tg of less than 80° C. is not preferable since the heat resistant temperature for use of the molded article become lower.

The method for measuring the glass transition temperature Tg of the hydrogenated β-phellandrene polymer may be the same as for measurement of the glass transition temperature Tg of the unhydrogenated β-phellandrene polymer.

<Regarding the total light transmittance of β-phellandrene polymer used for various molded articles>

The total light transmittance of the β-phellandrene polymer used for various molded articles is preferred to be as high as possible within a range generally required for the particular use. Specifically, the total light transmittance is preferably 80% or more, more preferably 85% or more, and even more preferably 90% or more. For example, when the total light transmittance is measured using a plate-like test piece which has a thickness of approximately 100 μm and is composed only of a β-phellandrene polymer, the total light transmittance is preferably 80% or more, more preferably 85% or more, even more preferably 90% or more, and most preferably 95% or more. Here, the total light transmittance is a value measured in accordance with JIS-K-7361: 1997 (ISO13468-1:1996).

<Regarding the water absorption of β-phellandrene polymer used for various molded articles>

The β-phellandrene polymer used for various molded articles is preferred to have lower water absorption from the view point of dimensional stability. The water absorption of β-phellandrene polymer is preferably 0.2% or less, more preferably 0.1% or less, and more preferably 0.05% or less, in terms of change in mass measured, as a saturated water absorption, with respect to a test piece allowed to stand at 60° C. in an atmosphere of 90% RH (relative humidity) for 24 hours.

<Regarding the specific gravity of β-phellandrene polymer used for various molded articles>

Since the specific gravity of the β-phellandrene polymer used for various molded articles is small, light-weighted molded articles can be obtained. The specific gravity of the β-phellandrene polymer used for various molded articles is 0.85 or more and less than 1.0 and preferably 0.85 to 0.98.

Here, the specific gravity is a value measured in accordance with the A method of JIS-K-7112: 1999.

<Regarding the photo-elasticity of β-phellandrene polymer used for various molded articles>

The photo-elasticity of the β-phellandrene polymer used for various molded articles is preferred to be small, and it is preferable that the photo-elasticity is small even at a temperature equal to or higher than the glass transition temperature Tg. By using the β-phellandrene polymer having a small photo-elasticity, molded articles of small optical distortion can be obtained.

A suitable photoelastic coefficient of the β-phellandrene polymer used for various molded articles at a temperature of Tg or higher (for example, Tg+20° C.) varies depending on the use of the molded articles, but the photoelastic coefficient is preferably $-3000 \times 10^{-13}$ to $3000 \times 10^{-13}$ cm$^2$/dyn, more preferably $-1000 \times 10^{-13}$ to $1000 \times 10^{-13}$ cm$^2$/dyn. When the photoelastic coefficient is within this range, a molded article of small optical distortion can be obtained with high productivity. Note that 1 dyn=$10^{-5}$ N.

<Regarding the flexural modulus of the β-phellandrene polymer used for various molded articles>

The flexural modulus of the β-phellandrene polymer used for various molded articles is preferably 2500 MPa or more, and more preferably 2700 MPa or more. When the flexural modulus is within this range, the deformation due to deflection can be suppressed; therefore, when the molded article is a plastic lens, the thickness thereof can be reduced.

<Regarding the refractive index of β-phellandrene polymer used for various molded articles>

The refractive index nD (25° C.) of the β-phellandrene polymer used for various molded articles is preferably 1.450 to 1.600. When the refractive index is within this range, the molded articles as described above can be produced in the same manner as in the case of using the conventional transparent resins (the refractive index of PMMA is 1.49, the refractive index of PC is 1.59). Furthermore, when the molded article is a plastic lens, the thickness of the lens can be reduced. Here, the refractive index nD (25° C.) is a value measured in accordance with JIS-K-7142. For the measurement, as a test piece, for example, the β-phellandrene polymer formed into a flat plate having a thickness of 100 μm can be used.

<Regarding the Abbe number of β-phellandrene polymer used for various molded articles>

The Abbe number of the β-phellandrene polymer used for various molded articles, particularly, a molded article for use as plastic lens, is preferably in the range of 55 to 65, more preferably 57 to 63. When the Abbe number is within this range, the chromatic aberration can be suppressed to a low level, and the Abbe number is in good balance with the refractive index within the aforementioned preferable range. For the measurement, as a test piece, for example, the β-phellandrene polymer formed into a flat plate having a thickness of 100 μm can be used.

<Regarding the tensile strength of β-phellandrene polymer used for various molded articles>

The tensile strength of the β-phellandrene polymer used for various molded articles is preferably 60 MPa or more, more preferably 70 MPa or more, even more preferably 80 MPa or more, as measured with respect to a 3.2 mm-thick, plate-like test piece formed from the polymer. The upper limit of the tensile strength is not particularly limited and is preferred to be as high as possible, but is generally about 100 MPa. Here, the tensile strength is a value obtained by the measurement method in accordance with ASTM D638.

<Regarding the β-phellandrene polymer content in various molded articles>

The β-phellandrene polymer content in the molded articles according to various embodiments to be described below (resin parts) may be 60 to 100% by mass, 70 to 100% by mass, 80 to 100% by mass, 90 to 100% by mass, 95 to 100% by mass, or 98 to 100% by mass, based on the total mass of the molded article.

<Regarding hydrogenation (hydrogen addition) of the β-phellandrene polymer constituting each molded article>

From the viewpoint of improving the heat resistance of the β-phellandrene polymer constituting the molded articles according to various embodiments described below, at least a part of the olefinic carbon—carbon double bonds in the β-phellandrene polymer used in each of the embodiments is preferably hydrogenated.

<Optical plastic film>

The optical plastic film of the first embodiment is a film containing the β-phellandrene polymer described above in an amount of 50 to 100% by mass, based on the total mass of the optical plastic film. The β-phellandrene polymer constituting the film has a glass transition temperature Tg of 80° C. or more and a specific gravity of 0.85 or more and less than 1.0.

The mechanical strength and heat resistance of the optical plastic film of the present embodiment can be improved by improving the mechanical strength and heat resistance of the β-phellandrene polymer which is the main component of the film. From the viewpoint of improving the mechanical strength and heat resistance of the β-phellandrene polymer, as described above, the Tg is preferably 80 -350° C., more preferably 85 to 250° C., further more preferably 90 to 220° C., even more preferably 90 to 200° C., and most preferably 100 to 200° C. For the same reason, the number average molecular weight Mn of the β-phellandrene polymer is preferably 40,000 or more, more preferably 60,000 or more, further more preferably 80,000 or more, still more preferably 100,000 or more, even more preferably 120,000 or more, further even more preferably 140,000 or more, particularly more preferably 160,000 or more, and most preferably 180,000 or more. The upper limit of the number average molecular weight Mn is not particularly limited, but from the viewpoint of improving the moldability and processability, in general, the Mn is preferably 800,000 or less, more preferably 600,000 or less, further more preferably 400,000 or less.

For the same reason as described above, the mass average molecular weight Mw of the β-phellandrene polymer is preferred to be as large as possible. Specifically, the Mw is preferably 50,000 or more, more preferably 70,000 or more, further more preferably 90,000 or more, even more preferably 110,000 or more, particularly preferably 130,000 or more, most preferably 150,000 or more. Although the upper limit of the mass average molecular weight Mw of the β-phellandrene polymer is not particularly limited, from the viewpoint of improving the moldability and processability, in general, the Mw is preferably 1,000,000 or less, more preferably 800,000 or less, still more preferably 600,000 or less. The mass average molecular weight can be calculated from the measured data obtained in the same manner as in the case of the number average molecular weight.

For the same reason as described above, the Mw/Mn of the β-phellandrene polymer is preferably 1 to 25, more preferably 1.05 to 20, further more preferably 1.1 to 10.

When the optical plastic film of the present embodiment contains the β-phellandrene polymer described above in an amount of 50 to 100% by mass, based on the total mass of the film, the specific gravity of the optical plastic film may be usually within the range of 0.85 to 1.0. Since the specific gravity of the β-phellandrene polymer is lower than those of conventional resins such as an acrylic resin, a PET resin, a polyvinyl chloride resin and the like, the film according to this embodiment containing the β-phellandrene polymer as a main component is superior to the film made of any of these conventional resins in respect of lightness in mass.

The total light transmittance of the optical plastic film of the present embodiment is preferred to be as high as possible within a range generally required for the particular use. Specifically, the total light transmittance is preferred to be as described above.

When the optical plastic film of the present embodiment contains the β-phellandrene polymer described above in an amount of 50 to 100% by mass, based on the total mass of the film, the water absorption of the optical plastic film is preferred to be as described above.

Since the β-phellandrene polymer has lower water absorption than the conventional acrylic resin, the plastic film of this embodiment containing the β-phellandrene polymer as a main component is superior to the film made of the conventional acrylic resin in respect of dimensional stability.

When the optical plastic film of the present embodiment contains the β-phellandrene polymer described above in an amount of 95 to 100% by mass, based on the total mass of the film, the photoelastic coefficient of the optical plastic film may be at the same level as the aforementioned preferable photoelastic coefficient of the β-phellandrene polymer.

The thickness (film thickness) of the optical plastic film of the present embodiment is preferably 600 μm or less through the entire film. As the thickness (film thickness) becomes smaller, the transparency thereof increases and the phase difference of the light passing through the film becomes smaller. The lower limit of the film thickness is not particularly limited but is preferably about 10 μm from the viewpoint of maintaining the excellent mechanical strength of the film.

In the present embodiment, the film thickness is a value measured by the contact method in accordance with the A method in JIS-K-7130: 1999.

The thickness deviation of the optical plastic film of the present embodiment is preferably 3.0% or less, and more preferably 2.4% or less, relative to the film thickness (standard thickness). With such a small thickness deviation, the color unevenness in the case of installing the optical plastic film of the present embodiment to the image display surface of the liquid crystal display device can be reduced.

Here, the thickness deviation (%) is a coefficient variation in percentage terms, which is calculated from the data of nine thickness values obtained by measurement at nine points within an area of 100 cm² of the film in accordance with the A method in JIS-K-7130 1999.

Regarding the optical plastic film of the present embodiment, the tensile strength measured with respect to the film of 100 μm thickness is preferably 60 MPa or more, more preferably 70 MPa or more, further more preferably 80 MPa or more. The upper limit of the tensile strength is not particularly limited and is preferred to be as high as possible, but is generally about 100 MPa.

Here, the tensile strength is a value obtained by the measurement method in accordance with ISO 527. The film of use in measurement has a thickness of 100 μm.

<Method for producing the optical plastic film>

The method for producing (molding) the optical plastic film is not particularly limited, and for example, may be a conventional method for producing a resin molded article such as a solution casting method, a melt extrusion method or the like.

When the melt extrusion method is employed for producing the optical plastic film according to the present embodiment, for example, the production can be performed by a method comprising melting a β-phellandrene polymer in an extruder, extruding the β-phellandrene polymer into a sheet through a die attached to the extruder, and withdrawing the sheet in a state of being adhered to at least one cooling drum where the sheet is shaped.

When the solution casting (casting) method is employed for producing the optical plastic film according to the present embodiment, for example, the production can be performed by a method comprising dissolving a β-phellandrene polymer in a suitable organic solvent such as the above-mentioned solvent used for the hydrogenation treatment, thereby preparing a polymer solution of a concentration suitable for casting, casting the polymer solution on a mirror surface such as metal by a conventional method, evaporating off the solvent, thereby obtaining a desired film.

Specific examples of uses of the optical plastic film according to the present embodiment include a polarizing plate protective film for flat panel displays such as a liquid crystal display, a retardation film, a surface protective film for electroluminescent devices, substrate films for various functional films and the like. Examples of the substrate film include a transparent conductive film, an antireflection film, an antistatic film, a hard coat film and the like.

The optical plastic film of the present embodiment can be used also as a surface protective film for protecting the surface to be protected. For example, the surface can be protected with the film by disposing the film on the surface to be protected by any known method such as glueing, sticking, thermocompression bonding or the like.

The surface of the optical plastic film of the present embodiment may be processed by any known surface processing method such as a hard coat processing, a water-repellent processing, an anti-reflective processing, an antistatic processing, a conductivity imparting processing or the like, or may not be processed by any of these methods.

Example of the film having a laminated structure include an antireflection film laminated with a known anti-reflection layer, a hard coated film which is laminated with a known hard coat layer, a light diffusion film which is laminated with a known diffusion layer capable of diffusing light, a transparent conductive film laminated with a known conductive layer, and a brightness improving film which is capable of improving the brightness of the image display device due to the lamination of a layer having a refractive index different from that of the substrate film.

For example, by providing an anti-reflection layer on the substrate film, the antireflection film can be produced. Regarding the structure of the antireflection layer, the layer may have a structure provided with a coating layer having a rough surface which randomly reflects the external light, or a structure provided with a coating layer having a low refractive index such that the reflectivity is reduced by the interference between a light reflected from the surface of the coating layer and a light reflected at an interface between the substrate and the coating layer.

For example, by forming a large number of fine irregularities on the surface of the substrate film, a light diffusion film with improved light diffusion can be obtained. Alternatively, another layer may be provided on the substrate film, where the irregularities are formed on the surface of the layer. Examples of the shape of the irregularities include a trigonal pyramid, and a planar prism having a waveform cross-section or a triangular cross-section. Also, a light diffusing layer may be provided on the substrate film surface.

For example, by providing a transparent conductive layer on the substrate film, the transparent conductive film can be obtained. The transparent conductive layer can be obtained by forming a layer imparted with conductivity in such thickness and dispersed state that the transparency can be maintained. The conductivity can be imparted to the layer by using inorganic materials such as ITO, FTO, $SnO_2$, $ZnO_2$, Cu, Ag and the like; or organic materials such as PEDOT-PSS, polyaniline, polypyrrole, polythiophene and the like.

For example, by providing a brightness improving layer on the substrate film, the brightness improving film can be obtained. Examples of the brightness improving layer include a multilayer laminate of dielectric substances designed to transmit only the linearly polarized light and to reflect other lights, an alignment layer designed to transmit only the circular polarized light and to reflect other lights. This layer can be formed by any conventional method.

In the case of using the optical plastic film of the present embodiment as a polarizing plate protective film, for example, a polarizing film having the polarizing plate protective film(s) laminated on one or both sides of a polarizing plate via a suitable adhesive or the like can be obtained. On one side of the polarizing plate constituting the polarizing film, a retardation film as described below may further be laminated.

In the case of using the optical plastic film of the present embodiment as a retardation film, the film is preferably stretched in order to cause a desired phase difference.

The stretch processing method for stretching the optical plastic film of the present embodiment in at least one direction is not limited, and any known method can be applied.

The purpose of the above stretch processing is not limited to the mere production of the retardation film. The stretch processing may also be carried out in order to impart the optical plastic film of the present embodiment with properties desired in other applications.

The optical plastic film of the present embodiment can be advantageously used as a functional film for image display devices. There is no particular limitation as to how the functional film is installed in the image display device, and the film may be installed in any conventional manner.

The optical plastic film of the present embodiment is equivalent to or superior to the conventional resins derived from petroleum such as polyolefin resins, acrylic resins, and carbonate-based resin in respect of physical properties such as optical transparency, heat resistance, water absorption, light resistance, photoelastic coefficient and mechanical strength. Moreover, since the specific gravity of the optical plastic film of the present embodiment is lower than many conventional resins, the film excels in lightness in mass.

A conventionally known film made of a β-pinene polymer is equivalent to the present embodiment in respect of lightness in mass, but the film of the β-phellandrene polymer of the present embodiment is superior to the film made of a β-pinene polymer in mechanical properties such as tensile strength. The β-phellandrene is easy to form polymers having a large number average molecular weight, which is considered to be one of the possible factors for the tendency that a film having excellent mechanical strength is likely to be obtained.

Thus, by using the optical plastic film of the present embodiment, a thin functional film of lightmass can be produced while maintaining the same strength.

Regarding the molded articles exemplified below, the same explanations as made above for the optical plastic films of the first embodiment can be applied with respect to the preferred ranges of the Tg, the number average molecular weight Mn, the mass average molecular weight Mw, the specific gravity, the water absorption, and the total light transmittance.

<Plastic lens>

A plastic lens of the second embodiment is a lens containing the β-phellandrene polymer described above in an amount of 50 to 100% by mass, based on the total mass of the plastic lens. The β-phellandrene polymer constituting the plastic lens has a specific gravity of 0.85 or more and less than 1.0 and a total light transmittance of 90% or more. By using the β-phellandrene polymer having such a high transparency as a main component, the transparency of the plastic lens of the present embodiment can be increased. The refractive index of the β-phellandrene polymer is preferably within the range of 1.45 to 1.60. The Abbe number of the β-phellandrene polymer is preferably within the range of 55 to 65.

The shape of the plastic lens of the present embodiment is not particularly limited as long as it enables the incident light to be diverged and converged, and any conventionally known lens shapes are applicable. For example, the lens may be in a shape of concave lens, convex lens, a concave-convex lens, and the like. The curved surface of the lens may be spherical or aspherical. The size of the plastic lens of the present embodiment is not particularly limited and may be suitably designed in accordance with the use of the lens.

<Method for producing the plastic lens>

The method for producing the plastic lens according to the present embodiment is not limited, and any known method for producing the conventional lens made of resin can be employed. Examples of the method include a method comprising melt plasticizing a composition containing the β-phellandrene polymer uniformly by a screw in a heated cylinder of an extruder, extruding a suitable amount of the resin composition or injecting it into a mold, and cooling and hardening the resultant to obtain a molded article.

The plastic lens of the present embodiment can be subjected to a known surface treatment such as an antireflection treatment, a surface hardening treatment, an antifogging treatment, a water repellent treatment and the like.

The plastic lens of the present embodiment is equivalent to or superior to the conventional resins derived from petroleum such as polyolefin resins, acrylic resins, carbonate-based resin in respect of physical properties such as optical transparency, heat resistance, water absorption, light resistance, the photoelastic coefficient and mechanical strength and the like. Moreover, since the specific gravity of the optical plastic film of the present embodiment is lower than many conventional resins, the film excels in lightness in mass.

A conventionally known plastic lens made of a β-pinene polymer is equivalent to the plastic lens of the present embodiment in respect of lightness in mass, but the plastic lens made of the β-phellandrene polymer of the present embodiment is superior to the plastic lens made of a β-pinene polymer in the mechanical properties such as impact resistance. The β-phellandrene is easy to form polymers having a large number average molecular weight, which is considered to be one of the possible factors for the tendency that a plastic lens having excellent mechanical strength is likely to be obtained.

Thus, by using the β-phellandrene polymer, a thin functional film of lightmass can be produced while maintaining the same strength.

<Additive>

In accordance with the needs in each application, the β-phellandrene polymer constituting the molded articles of the embodiments described above may be mixed with the following additives, each of which may be used alone or in combination of one or more other additives.

The additive is not particularly limited as long as it is usually used in the conventional resin industry. Examples of the additive include antioxidants, ultraviolet absorbers, light stabilizers, near-infrared absorbing agent, coloring agent such as a dye and pigment, lubricants, plasticizers (softening agent), antistatic agents, fluorescent whitening agents, fillers and the like.

Each of the additives may be used individually, or two or more of the additives may be used in combination. In the case of the latter, the mixing ratio can be appropriately selected. The amount of each additive can be appropriately selected, and is usually about 0.001 to 5 parts by mass, preferably in a range of 0.01 to 1 part by mass, relative to 100 parts by mass of the β-phellandrene polymer.

<Optional polymer component>

In accordance with the needs in each application, the β-phellandrene polymer constituting the molded articles of the embodiments described above may be mixed with the following polymer components, each of which may be used alone or in combination of one or more other polymer components.

The polymer component described above may be, for example, a rubbery polymer, specific examples of which include a diene rubber such as a natural rubber, a polybutadiene rubber, a polyisoprene rubber, and an acrylonitrile-butadiene copolymer rubber; a styrene-butadiene copolymer rubber, a styrene-isoprene copolymer rubber, a styrene-butadiene-isoprene terpolymer rubber; a hydrogenated product of a diene-based rubber; a saturated polyolefin rubber such as an ethylene-α-olefin copolymer such as an ethylene-propylene copolymer, and a copolymer of propylene and other α-olefin; an α-olefin diene polymer rubber such as an ethylene-propylene-diene copolymer, an α-olefin-diene copolymer, an isobutylene-isoprene copolymer, and an isobutylene-diene copolymer; a special rubber such as a urethane rubber, a silicone rubber, a polyether rubber, an acrylic rubber, a propylene oxide rubber, and an ethylene-acrylic rubber; a thermoplastic elastomer such as a styrene-butadiene-styrene block copolymer rubber, a styrene-isoprene-styrene block copolymer rubber; a hydrogenated thermoplastic elastomer; a urethane-based thermoplastic elastomer; a polyamide-based thermoplastic elastomer; and a 1,2-polybutadiene-based thermoplastic elastomer. The amount of the optional polymer component can be appropriately selected, and is for example about 3 to 30 parts by mass, and preferably 5 to 20 parts by mass, relative to 100 parts by mass of the β-phellandrene polymer.

EXAMPLE

Next, the present invention is described in more detail with reference to the Examples; however, the present invention is not limited to these Examples.

Example 1

Production of β-Phellandrene Polymer 78.6 ml of toluene (manufactured by Kanto Chemical Co., Inc.) was poured into a dried 300 ml glass flask and cooled to 0° C. Thereto was added, as a Lewis acid catalyst, $EtAlCl_2$ (ethylaluminum dichloride) (17% hexane solution, about 1 mol/L, manufactured by Tokyo Chemical Industry Co., Ltd.) in an amount corresponding to 7.3 parts by mass (0.035 ml) relative to 100 parts by mass of the β-phellandrene as a monomer. The added matters were dispersed well in the resultant, to which 6.0 ml (5.1g) of β-phellandrene (purity 83.3% by mass) prepared by chemical synthesis was slowly added dropwise. After one minute, the reaction was terminated by the addition of 10 ml of methanol. The reaction solution was transferred to a separatory funnel, followed by addition of 20 ml of 1% sodium hydroxide solution. The resulting was stirred well, whereafter the aqueous phase was separated away therefrom. Then, the organic solvent phase was slowly evaporated off by an evaporator, and the reaction solution was concentrated. 40 ml of the concentrated reaction solution was slowly dropped to 300 ml of methanol, thereby allowing the polymerized compound to reprecipitate. The resulting precipitate was separated from the solution by filtration and sufficiently dried, thereby obtaining a β-phellandrene polymer. The conversion of the monomer in the reaction was 100%.

The obtained β-phellandrene polymer had a number-average molecular weight of 40,900 and a glass transition temperature of 85° C.

[Hydrogenation]

4 g of the obtained β-phellandrene polymer was added to and sufficiently dissolved in 90 ml of dehydrated hexane in a pressure vessel which had been sufficiently purged with nitrogen. Thereto was added 10 g of a palladium-alumina catalyst (manufactured by Wako Pure Chemical Industries, Ltd., Pd: 5%) and a hydrogenation reaction was performed under a hydrogen atmosphere of 8 MPa, at 120° C. for 10 hours. The catalyst was removed by filtering the reaction solution through a filter made of Teflon® which had a pore size of 1 μm. Then, the resulting was subjected to a reprecipitation with methanol and a sufficient drying, and the hydrogenated product of the β-phellandrene polymer was obtained in an amount of 4.5 g.

The hydrogenation ratio of the obtained polymer was calculated from the data obtained by $^1$H-NMR spectroscopy, and was found to be 99.9%. The polymer had a number average molecular weight of 40,500, a glass transition temperature of 130° C., and a total light transmittance of 92%.

Example 2

A β-phellandrene polymer was obtained under the same conditions as in Example 1 except that the reaction temperature was changed to −40° C. and the reaction time was changed to 5 minutes. The conversion of the monomer in the reaction was 100%, and the obtained polymer had a number average molecular weight of 40,000 and a glass transition temperature of 82° C.

Furthermore, the polymer obtained by hydrogenation carried out in the same manner as Example 1 had a hydrogenation ratio of 99.9%, a number average molecular weight of 39,500, a glass transition temperature of 125° C., and a total light transmittance of 93%.

Example 3

A β-phellandrene polymer was obtained under the same conditions as in Example 1 except that the reaction time was changed to 10 sec. The conversion of the monomer in the reaction was 88%, and the obtained polymer had a number average molecular weight of 33,800 and a glass transition temperature of 82° C.

Furthermore, the polymer obtained by hydrogenation carried out in the same manner as Example 1 had a hydrogenation ratio of 99.9%, a number average molecular weight of 33,500, a glass transition temperature of 125° C., and a total light transmittance of 93%.

Example 4

This Example was performed under the same conditions as in Example 1 except that the origin of β-phellandrene monomer was changed to that in the form of a mixed material of the aforementioned optical isomers purified from a plant and the solvent used for the polymerization reaction was changed to hexane. The purity of the β-phellandrene in the material described above was 99.3%. The material described above was obtained by performing a precision distillation of an essential oil obtained from Abies sachalinensis (plant) by steam distillation thereof, adding a Diels-Alder reaction reagent to the resulting concentrated solution, and removing substances having trans conjugated double bonds.

The conversion of the monomer in the reaction was 100%, and the obtained polymer had a number average molecular weight of 80,200 and a glass transition temperature of 84° C.

Furthermore, the hydrogenated polymer had a hydrogenation ratio of 99.7%, a number average molecular weight of 80,000, a glass transition temperature of 131° C., and a total light transmittance of 93%.

Example 5

Example 5 was performed under the same conditions as in Example 4 except that the reaction temperature was changed to −78° C.

The conversion of the monomer in the reaction was 100%, and the obtained polymer had a number average molecular weight of 139,400 and a glass transition temperature of 88° C.

Furthermore, the hydrogenated polymer had a hydrogenation ratio of 99.6%, a number average molecular weight of 138,500, a glass transition temperature of 139° C., and a total light transmittance of 92%.

Example 6

Example 6 was performed under the same conditions as in Example 4 except that the reaction temperature was changed to 20° C.

The conversion of the monomer in the reaction was 100%, and the obtained polymer had a number average molecular weight of 57,700 and a glass transition temperature of 81° C.

Furthermore, the hydrogenated polymer had a hydrogenation ratio of 99.9%, a number average molecular weight of 57,300, a glass transition temperature of 125° C., and a total light transmittance of 93%.

Example 7

This Example was performed under the same conditions as in Example 4 except that, as electron donating agents, 2,6-di-t-butyl-pyridine (manufactured by Tokyo Kasei Kogyo Co., Ltd.) was further added to the reaction solution in an amount of 0.072 g (1.4 parts by mass relative to 100 parts by mass of the β-phellandrene polymer) after the β-phellandrene monomer was added.

The conversion of the monomer in the reaction was 42%, and the obtained polymer had a number average molecular weight of 75,300 and a glass transition temperature of 87° C.

Furthermore, the hydrogenated polymer had a hydrogenation ratio of 99.8%, a number average molecular weight of 74,500, a glass transition temperature of 133° C., and a total light transmittance of 92%.

Example 8

A β-phellandrene polymer was obtained under the same conditions as in Example 4 except that the solvent of the polymerization reaction was changed to methylcyclohexane. The conversion of the monomer in the reaction was 100%, and the obtained polymer had a number average molecular weight of 82,200 and a glass transition temperature of 84° C.

Furthermore, the hydrogenated polymer had a hydrogenation ratio of 99.7%, a number average molecular weight of 82,000, a glass transition temperature of 133° C., and a total light transmittance of 93%.

Example 9

A β-phellandrene polymer was obtained under the same condition as in Example 8 except that the temperature of the polymerization reaction was changed to 80° C. The conversion of the monomer in the reaction was 80%, and the obtained polymer had a number average molecular weight of 20,200 and a glass transition temperature of 81° C.

Furthermore, the hydrogenated polymer had a hydrogenation ratio of 99.7%, a number average molecular weight of 20,000, a glass transition temperature of 120° C., and a total light transmittance of 93%.

TABLE 1

| | Monomer Purity(% by mass) | Reaction Temperature, Reaction Time | Number Average Molecular weight of the Hydrogenated polymer | Glass Transition Temperature of the Hydrogenated polymer |
|---|---|---|---|---|
| Example 1 | 83.3% | 0° C., 1 min | 40,500 | 130° C. |
| Example 2 | 83.3% | −40° C., 5 min | 39,500 | 125° C. |
| Example 3 | 83.3% | 0° C., 10 sec | 33,500 | 125° C. |
| Example 4 | 99.3% | 0° C., 1 min | 80,000 | 131° C. |
| Example 5 | 99.3% | −78° C., 1 min | 138,500 | 139° C. |
| Example 6 | 99.3% | 20° C., 1 min | 57,300 | 125° C. |
| Example 7 | 99.3% | 0° C., 1 min | 74,500 | 133° C. |
| Example 8 | 99.3% | 0° C., 1 min | 82,000 | 133° C. |
| Example 9 | 99.3% | 80° C., 1 min | 20,000 | 120° C. |

Comparative Example 1

This Comparative Example was performed under the same conditions as in Example 4 except that commercially available reagent β-pinene (manufactured by Wako Pure Chemical Industries, Ltd., purity: 95%) was used as monomer instead of the β-phellandrene. The molecular weight of the obtained polymer was 3,200. The conversion of the monomer in the reaction was 3%.

Reference Example 1

Reference Example 1 was performed under the same conditions as in Example 4 except that the purity of the β-phellandrene derived from plants was changed to 80% and the reaction time was changed to 24 hours.

The number average molecular weight of the obtained polymer was 5,000.

<Measurement Methods of Physical Properties of the β-phellandrene polymer and the hydrogenated thereof>
(Conversion in the Synthesis of β-Phellandrene Polymer)

The conversion in the synthesis of β-phellandrene polymer was calculated according to the reduction ratio of the area of signals within a range of 5.5 to 6.5 ppm, the signals being attributable to the conjugated double bonds of the β-phellandrene monomer, with using the o-dichlorobenzene as the internal standard.

(Number average molecular weight)

The number average molecular weight was measured in terms of standard polystyrene. The device used for the measurement was a system composed of RID-10 differential refractive index detector and LC-20AD solvent delivery unit, each manufactured by Shimadzu Corporation. As columns, two Shodex KF803 columns (manufactured by Showa Denko KK) were used. As a solvent, THF (40° C.) was used.

(Hydrogenation ratio)

As a solvent, deuterated chloroform was used. The TMS signal was set to 0 ppm for correction. $^1$H-NMR spectroscopy was performed by using JNM-ECX400 (400MHz), which is an NMR apparatus (manufactured by JEOL Ltd.). The measurements were performed at room temperature.

The reduction ratio of peaks within the range of 5.0 to 6.0 ppm attributable to the unsaturated bonds in the spectrum before the hydrogenation was obtained from the results of the measurement. The reduction ratio was calculated as the ratio A/B, in which A is the integral value of the signals attributable to the protons of the olefinic double bonds at 5.0 to 6.0 ppm, and B is the integral value of the signals attributable to the protons of the saturated hydrocarbon at 0.5 to 2.5 ppm. The hydrogenation ratio (%) was calculated as (A/B (Before)−A/B (After))×100/A/B (Before).

(Glass transition temperature)

The glass transition temperature was measured by a differential thermal measurement device in accordance with JIS-K-7121-1987 "measuring method for transition temperature of the plastic". The device used for the measurement was DSC-60 (manufactured by Shimadzu Corporation).

(Total light transmittance)

The total light transmittance was measured in accordance with JIS-K-7361: 1997 (ISO13468-1: 1996). The device used for the measurement was a haze meter TC-H3DPK/II (manufactured by Tokyo Denshoku).

A film having a thickness of 100 μm made of the prepared β-phellandrene polymer or polymer obtained by hydrogenating the β-phellandrene was produced by melt-extrusion method, and was used as a measurement sample.

<Production of molded articles>

An optical plastic film and a plastic lens were produced as follows by using the hydrogenated product of the β-phellandrene polymer as a raw material.

[Synthesis of β-phellandrene polymer]

The hydrogenated product of the β-phellandrene polymer used as a raw material for the molded article was synthesized as follows.

Synthesis Example 1

68 parts by mass of hexane (Kanto Chemical Co., Ltd.) were poured into a dried glass flask, and cooled to 0° C. Thereto was added, as a Lewis acid catalyst, 0.37 part by mass of EtAlCl$_2$ (ethylaluminum dichloride) (17% hexane solution, about 1 mol/L, manufactured by Tokyo Chemical Industry Co., Ltd.). The added matters were dispersed well in the resultant, to which 5.1 parts by mass of the β-phellandrene (purity 83.3%) prepared by chemical synthesis were slowly added dropwise. After one minute, the reaction was terminated by the addition of 8 parts by mass of methanol. The reaction solution was transferred to a separatory funnel, followed by addition of 20 parts by mass of 1% sodium hydroxide solution. The resulting was stirred well, whereafter the aqueous phase was separated away therefrom. Then, the organic solvent phase was slowly evaporated off by an evaporator, and the reaction solution was concentrated. About 40 parts by mass of the concentrated reaction solution were slowly dropped to 240 parts by mass of methanol, thereby allowing the polymerized compound to reprecipitate. The resulting precipitate was separated from the solution by filtration and sufficiently dried, thereby obtaining a β-phellandrene polymer. The conversion of the monomer in the reaction was 100%.

The obtained β-phellandrene polymer had a number-average molecular weight of 105,300 and a glass transition temperature of 85° C.

[Hydrogenation]

The resulting β-phellandrene polymer of 4 parts by mass was sufficiently dissolved in 61 parts by mass of dehydrated hexane in a pressure vessel which had been sufficiently purged with nitrogen. Thereto were added 10 parts by mass of a palladium-alumina catalyst (manufactured by Wako Pure Chemical Industries, Ltd., Pd: 5%) and a hydrogenation reaction was performed under a hydrogen atmosphere of 8 MPa, at 120° C. for 10 hours. The catalyst was removed by filtering the reaction solution through a filter made of Teflon® which had a pore size of 1 μm. Then, the resulting was subjected to a reprecipitation with methanol and a sufficient drying, and the hydrogenated product of the β-phellandrene polymer was obtained in an amount of 4.5 g.

The hydrogenation ratio of the obtained β-phellandrene polymer was calculated by $^1$H-NMR spectroscopy, and was found to be 99.9%. The hydrogenated polymer had a number-average molecular weight of 104,000, a glass transition temperature of 130° C., and a specific gravity of 0.93.

Synthesis Example 2

A β-phellandrene polymer having a number-average molecular weight of 139,400 was produced in the same method as in Synthesis Example 1 except that the reaction temperature was changed to −78° C. The obtained polymer was subjected to a hydrogenation, thereby obtaining a hydrogenated β-phellandrene polymer having a hydrogenation ratio of 99.9%, a number average molecular weight of 138,500, a glass transition temperature of 139° C., and a specific gravity of 0.93.

The measurements for evaluating the physical properties of the β-phellandrene polymer and the hydrogenation product thereof obtained in Synthesis Examples 1 and 2 were carried out by the aforementioned methods.

<Production of the optical plastic film>

Example A1

0.1 part by mass of 2-(2-hydroxy-5-t-butylphenyl)-2H-benzotriazole as an ultraviolet absorber and 0.1 part by mass of pentaerythritol tetrakis [3-(3,5-di-tert-butyl-4-hydroxyphenyl) propionate as an antioxidant were mixed with 100 parts by mass of the hydrogenated product of β-phellandrene polymer obtained in Synthesis Example 1 (hereinafter, may also be referred to as β-phellandrene polymer hydrogenated product) by a powder blender, and the resulting was melt-kneaded by a twin screw extruder (TEX33, Japan Steel Works, Ltd.), thereby obtaining a pelletized composition comprising a β-phellandrene polymer hydrogenated product.

The obtained pelletized composition was dried at 90° C. for 5 hours by a hot air drier. The dried pellets were melt-extruded at 240° C. by using a twin screw extruder equipped with a T-die with a slit width of 10 cm. The resulting sheet-like composition of β-phellandrene polymer hydrogenated product was passed through triplet cooling rolls, thereby obtaining a film having a width of about 70 mm and a thickness of 100 μm. The physical properties of the obtained film, such as total light transmittance, glass transition temperature, water absorption, light resistance, photoelastic coefficient, tensile strength, thickness variation, and specific gravity, were measured by the methods described below. The results are shown in Table 2.

Example A2

A β-phellandrene polymer having a number-average molecular weight of 139,400 was produced by the method of Example A1 except that the reaction temperature was changed to −78° C. The obtained polymer was subjected to a hydrogenation, thereby obtaining a hydrogenated β-phellandrene polymer having a hydrogenation ratio of 99.9%, a number average molecular weight of 138,500, a glass transition temperature of 139° C., and a specific gravity of 0.93. A film having a thickness of 100 μm was produced in the same manner as in Example A1, and then the physical properties of the film were measured. The results are shown in Table 2.

Comparative Example A1

The pellets of alicyclic polyolefin resin (ZEONOR 1060R, manufactured by Nippon Zeon Co., Ltd.) was dried at 80° C. for 4 hours by a hot air drier. Then, by using the same apparatus as in Example A1, the dried pellets were melt-extruded at 260° C. Then, the alicyclic polyolefin resin extruded into a sheet was cooled by being passed through triplet cooling rolls, thereby obtaining an extruded film having a width of about 70 mm and a thickness of 100 μm. The physical properties of the produced film were measured in the same manner as in Example A1. The results of the measurements are shown in Table 2.

Comparative Example A1

The pellets of poly(methyl methacrylate) resin (ACRYPET TF-8, manufactured by Mitsubishi Rayon Co.) were dried at 85° C. for 6 hours by a hot air drier. Then, the dried pellets were melt-extruded at 220° C. by using the same device as used in Example A1. The resulting alicyclic polyolefin resin extruded into a sheet was passed through triplet cooling rolls, thereby obtaining a film having a width of about 70 mm and a thickness of 100 μm. The physical properties of the produced film were measured in the same manner as in Example A1. The results of the measurements are shown in Table 2.

Comparative Example A3

A polycarbonate resin (Iupilon H-3000, manufactured by Mitsubishi Engineering Plastics Co.) was melt-extruded at 280° C. The resulting polycarbonate resin extruded into a sheet was passed through triplet cooling rolls, thereby obtaining a film having a thickness of 100 μm. The physical properties of the produced film were measured in the same manner as in Example A1. The results are shown in Table 2.

TABLE 2

| Evaluation | Example A1 | Example A2 | Comparative Example A1 | Comparative Example A2 | Comparative Example A3 |
|---|---|---|---|---|---|
| Number Average Molecular weight Mn | 104,000 | 138,500 | — | — | — |
| Hydrogenation Ratio (%) | 99.9 | 99.9 | — | — | — |
| Total Light Transmittance (%) | 93 | 93 | 93 | 93 | 91 |
| Glass Transition Temperature(° C.) | 130 | 139 | 105 | 110 | 145 |
| Water Absorption (% by mass) | Less than 0.01 | Less than 0.01 | Less than 0.01 | 0.3 | 0.15 |
| Light Resistance | A | A | B | A | A |
| Photo-Elasticity | A | A | C | A | C |
| Tensile Strength | A | A | B | A | B |
| Specific Gravity | A | A | B | C | C |
| Thickness Deviation | A | A | A | A | A |

From the results described above, it is clear that the optical plastic film of each of Examples A1 to A2 excels in optical transparency, heat resistance, light resistance, tensile strength, low water absorption, optical elasticity and lightness in mass, and has small thickness deviation as well. It is understood that the films of Examples A1 to A2 are superior to the films of Comparative Examples A1 to A3 in the balance of the various physical properties, and therefore can be advantageously used as an optical plastic film.

<Production of plastic lens>

Example B1

An aspherical objective lens having an outer diameter of 7 mm, a lens thickness of 2.5 mm, and a peripheral portion thickness of 3 mm was produced from the hydrogenated β-phellandrene polymer obtained in Synthesis Example 1 as a raw material by using an Injection molding machine SE-75 (manufactured by a Sumitomo Heavy Industries Ltd.). The results of the evaluation are shown in Table 3.

Example B2

An aspherical objective lens was produced in the same manner as in Example B1 except for the use of the hydrogenated β-phellandrene polymer obtained in Synthesis Example 2 as a raw material. The results of the evaluation are shown in Table 3.

Comparative Example B1

The pellets of alicyclic polyolefin resin (ZEONEX 480R, manufactured by Nippon Zeon Co. Ltd.) were dried at 80° C. for 4 hours by a hot air drier. Then, using the same apparatus as in Example B1, the dried pellets were subjected to an injection molding at 260° C., thereby forming a plastic lens. The physical properties of the produced plastic lens were measured in the same manner as in Example B1. The results of the evaluation are shown in Table 3.

Comparative Example B2

The pellets of poly(methyl methacrylate) resin (ACRY-PET TF-8, manufactured by Mitsubishi Rayon Co.) were dried at 85° C. for 6 hours by a hot air drier. Then, using the same apparatus as in Example B1, the dried pellets were subjected to an injection molding at 220° C., thereby forming a plastic lens. The physical properties of the produced plastic lens were measured in the same manner as in Example B1. The results of the evaluation are shown in Table 3.

Comparative Example B3

A polycarbonate resin (Iupilon H-3000, manufactured by Mitsubishi Engineering Plastics Co.) was subjected to an injection molding at 280° C. by using the same apparatus as in Example B1, thereby forming a plastic lens. The physical properties of the produced plastic lens were measured in the same manner as in Example B1. The results of the evaluation are shown in Table 3.

TABLE 3

| Evaluation | Example B1 | Example B2 | Comparative Example B1 | Comparative Example B2 | Comparative Example B3 |
|---|---|---|---|---|---|
| Number Average Molecular weight Mn | 104,000 | 138,500 | — | — | — |

TABLE 3-continued

| Evaluation | Example B1 | Example B2 | Comparative Example B1 | Comparative Example B2 | Comparative Example B3 |
|---|---|---|---|---|---|
| Hydrogenation Ratio (%) | 99.9 | 99.9 | — | — | — |
| Total Light Transmittance (%) | 93 | 93 | 92 | 89 | 93 |
| Glass Transition Temperature(° C.) | 130 | 139 | 135 | 100 | 145 |
| Resin Water Absorption (% by mass) | Less than 0.01 | Less than 0.01 | Less than 0.01 | 0.30 | 0.15 |
| Light Resistance | A | A | — | — | — |
| Photo-Elasticity | A | A | — | — | — |
| Flexural Modulus | A | A | B | A | B |
| Izod Impact Strength (J/m) | 35 | 40 | 24 | 26 | 58 |
| Refractive Index (nD) | 1.515 | 1.515 | 1.525 | 1.49 | 1.59 |
| Abbe Number | A | A | B | A | C |
| Specific Gravity | 0.93 | 0.93 | 1.01 | 1.18 | 1.20 |
| Moisture Resistance | A | A | — | — | — |
| Lens Water Absorption (% by mass) | Less than 0.01 | Less than 0.01 | — | — | — |

From the results described above, it is clear that the plastic lens of each of Examples B1 to B2 excels in optical transparency, heat resistance, light resistance, humidity resistance and impact resistance, low water absorption, photoelasticity, flexural modulus, and lightness in mass. It is understood that the plastic lenses of Examples B1 to B2 are superior to the plastic lenses of Comparative Examples B1 to B3 in the balance of the physical properties, and therefore can be advantageously used as a plastic lens.

<Measurement methods of physical properties of molded article>

(Total light transmittance)

The total light transmittance was measured in accordance with JIS-K-7361: 1997 (ISO13468-1:1996). The device used for the measurement was a haze meter TC-H3DPK/II (manufactured by Tokyo Denshoku) was used.

In the measurement of the total light transmittance regarding the optical plastic film as described above, a 100 µm-thick film of the hydrogenated synthesized β-phellandrene polymer as described above was produced by the melt-extrusion method, and was used as a measurement sample.

In the measurement of the total light transmittance regarding the optical plastic film as described above, a 3.2 mm-thick test piece of the hydrogenated β-phellandrene polymer synthesized above was produced by the melt-extrusion method, and used as a measurement sample.

(Glass transition temperature)

The glass transition temperature of the resin used was measured by the aforementioned method.

(Specific gravity)

In the measurement of the specific gravity regarding the optical plastic film as described above, a 100 µm-thick film produced by the melt-extrusion method was used as a measurement sample as described above. In the measurement of the specific gravity regarding the plastic lens as described above, the molded article was used as a measurement sample.

The specific gravity was evaluated based on the following criteria in accordance with the A method in JIS-K-7112 : 1999.

A: specific density <1.0: Low specific gravity (Excellent)
B: 1.0≤specific gravity≤1.1: High specific gravity (Poor)
C: 1.1≤specific gravity: Still higher specific gravity (Poor)

(Tensile strength)

In the measurement of the tensile strength regarding the optical plastic film as described above, the tensile strength of the film having a thickness of 100 µm produced above was measured at 23° C. in accordance with ISO 527 by the autograph (manufactured by Shimadzu Corporation), and evaluated according to the following criteria.

A: 60 MPa or more: High tensile strength (Excellent)
B: less than 60 MPa: Low tensile strength (Poor)

(Flexural modulus)

In the measurement of the flexural modulus regarding the plastic lens as described above, a 3.2 mm-thick test piece of the hydrogenated β-phellandrene polymer synthesized above was produced by the melt-extrusion method, and the flexural modulus of the polymer was measured using the test piece as a measurement sample.

The flexural moduli of the samples were measured in accordance with the A method in ASTM D790 and were evaluated based on the following criteria.

The sample thickness was 3.2 mm.
A: 2500 MPa or more: Excellent
B: less than 2500 MPa: Poor (Izod impact strength)

In the measurement of the flexural modulus regarding the plastic lens as described above, a 3.2 mm-thick test piece of the hydrogenated β-phellandrene polymer synthesized above was produced by the melt-extrusion method, and the Izod impact strength of the polymer was measured under the conditions for a notched sample in accordance with ASTM D256. The device used for the measurement was a universal impact tester (manufactured by Yasuda Seiki Seisakusho).

(Thickness deviation)

In the measurement of the thickness deviation regarding the optical plastic film as described above, the thickness deviation was measured using a 100 µm-thick film produced by the melt-extrusion method as a measurement sample in accordance with the A method in JIS-K-7130: 1999, and the results were evaluated based on the following criteria.

A: thickness deviation≤3.0 (%): Small thickness deviation (Excellent)

B: 3.0 (%)≤thickness deviation: Large thickness deviation (poor)

(Water absorption)

In the measurement of the water absorption regarding the optical plastic film as described above, the water absorption was measured in accordance with JIS-K-7209-2000, at 23° C. for 24 hours with respect to a 100 μm-thick film produced by the melt-extrusion method as a measurement sample.

In the measurement of the water absorption regarding the plastic lens as described above, a press-molded plate made of the β-phellandrene polymer hydrogenated product synthesized above, which had a length of 140 mm, a width of 60 mm, and a thickness of 3.2 mm, was used as a measurement sample. This plate was allowed to stand for 10 days at 60° C. in an atmosphere of 90% RH. Then, the water absorption was obtained in terms of a ratio of the increased mass relative to the initial mass which was calculated by the following formula.

Water absorption (%)=increased mass×100/initial mass (Moisture resistance)

In the measurement of the moisture resistance regarding the plastic lens as described above, a durability test was performed at 80° C. and 90% RH for 1000 hours, where the change in appearance of the lens was observed visually. The moisture resistance was evaluated based on the following criteria.

A: no change observed visually, and excellent appearance maintained

B: clouded or deformed, and appearance deteriorated (Light resistance)

In the measurement of the light resistance regarding the optical plastic film as described above, a 500 μm-thick film sample of the β-phellandrene polymer hydrogenated product synthesized above was produced and was used as a measurement sample.

In the measurement of the light resistance regarding the plastic lens as described above, a 3.2 mm-thick test piece of the hydrogenated β-phellandrene polymer synthesized above was produced by the melt-extrusion method and was used as the measurement sample.

The measurements of the light resistance of the optical plastic film and the plastic lens were performed using the respective measurement samples in accordance with JIS-K-7103. Specifically, the light resistance was evaluated by the following method.

The measurement sample was placed in a UV exposure test apparatus, and the accelerated exposure test was performed for 100 hours to measure the difference (ΔYI) between the YI (yellowness index) before the test and the YI after the test. The results of the YI measurement were evaluated based on the following criteria.

ΔYI=(YI after UV exposure for 100 hours)−(YI before UV exposure)

A: ΔYI≤1: Very good long-term light resistance

B: 1≤ΔYI :Poor long-term light resistance (Photoelastic coefficient)

In the measurement of the photoelastic coefficient regarding the optical plastic lens and the plastic lens as described above, a 0.2 mm-thick film sample of the β-phellandrene polymer hydrogenated product synthesized above was produced by the melt-extrusion method, and was used as a measurement sample.

The measurement sample above was annealed overnight at a temperature lower than Tg by 20° C., and a tensile stress was applied to the sample in the longitudinal direction thereof at a temperature higher than Tg by 20° C., where the retardation was measured by an ellipsometer M220 (manufactured by JASCO Corp.) and the photoelastic coefficient was calculated from the change in retardation relative to the stress. The absolute values of the calculated amount of change were categorized based on the following criteria.

A: less than 1000: Small change (Excellent)

B: 1000 or more and less than 3000: Acceptable change (Good)

C: 3000 or more: Large change (Poor)

The unit of the amount of change is $[\times^{-13} \text{ cm}^2/\text{dyn}]$ (Refractive index (nD))

In the measurement of the refractive index regarding the plastic lens as described above, a 100 μm-thick test piece of the β-phellandrene polymer hydrogenated product synthesized above was produced and the refractive index (nD) thereof was measured at 25° C. in accordance with JIS-K-7142. The device used for the measurement was Abbe refractometer DR-M4 (manufactured by Atago Co., Ltd.).

(Abbe number)

In the measurement of the Abbe number regarding the plastic lens as described above, a 100 μm-thick test piece of the β-phellandrene polymer hydrogenated product synthesized above was produced and the Abbe number thereof was measured at 25° C. The device used for the measurement was Abbe refractometer DR-M4 (manufactured by Atago Co., Ltd.). The measured values were evaluated based on the following criteria.

A: Abbe number≥57: Good

B: 57>Abbe number≥55: Average

C: 55>Abbe number: Poor

While elements and combinations thereof in preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The present invention is widely applicable in the field of molded articles such as an optical element, a film, an optical plastic film, and a plastic lens.

The invention claimed is:

1. A β-phellandrene polymer which is a polymerization product of at least one β-phellandrene compound represented by the following formula(I) or formula(II),

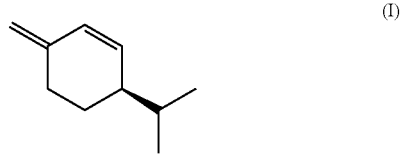

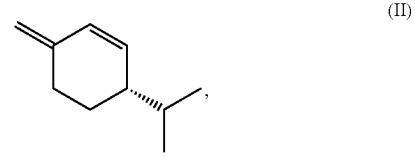

wherein the amount of the at least one β-phellandrene compound is 70% by mass or more, based on the total mass of the β-phellandrene polymer, and the β-phellandrene polymer has a number average molecular weight Mn of 40,000 or more.

2. The β-phellandrene polymer according to claim 1, which comprises β-phellandrene units represented by the following formula (I-1), formula (I-2), formula (II-1) and formula (II-2),

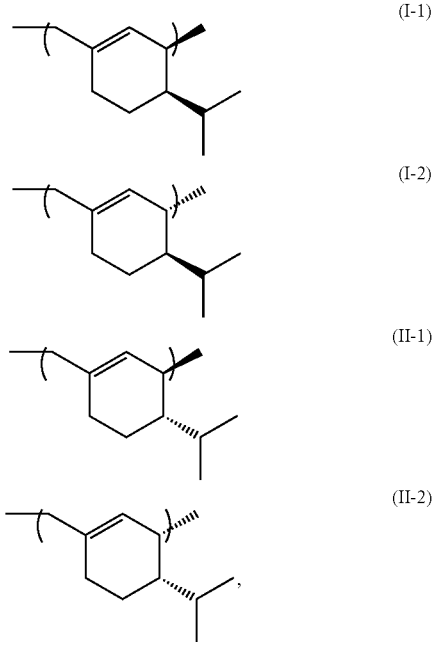

and
wherein a total amount of the β-phellandrene units is 70% by mass or more.

3. The β-phellandrene polymer according to claim 1, which has olefinic carbon-carbon double bonds, at least a part of which are hydrogenated.

4. The β-phellandrene polymer according to claim 1, which has a glass transition temperature of 80° C. or more.

5. The β-phellandrene polymer according to claim 1, which is obtained by cationic polymerization of the β-phellandrene compounds of formula (I) and formula (II) with a Lewis acid as a catalyst.

6. A method for producing a β-phellandrene polymer, comprising:
cationically polymerizing polymerizable compounds present in a reaction solution in the presence of a Lewis acid as a catalyst, to obtain the β-phellandrene polymer, wherein the reaction solution comprises β-phellandrene compounds of the following formula (I) and formula (II),

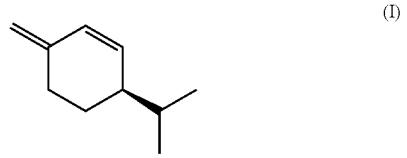

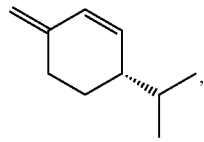

in an amount of 70% by mass or more, based on the total mass of the polymerizable compounds present in the reaction solution.

7. The method for producing the β-phellandrene polymer according to claim 6, wherein the amount of the β-phellandrene compounds of formula (I) and formula (II) is 90% by mass or more, based on the total mass of the polymerizable compounds present in the reaction solution.

8. The method for producing the β-phellandrene polymer according to claim 6, wherein the polymerizable compounds of formula (I) and formula (II) are polymerized until the number-average molecular weight Mn of the β-phellandrene polymer reaches or exceeds 40,000.

9. The method for producing the β-phellandrene polymer according to claim 6, wherein a reaction temperature for cationically polymerizing the polymerizable compounds of formula (I) and formula (II) is −90° C. to 100° C.

10. The method for producing the β-phellandrene polymer according to claim 6 which further comprises hydrogenating the obtained polymer after the cationic polymerization.

11. A molded article comprising the β-phellandrene polymer according to claim 1, wherein the amount of the β-phellandrene polymer is 50% by mass or more, based on the total mass of the molded article.

12. The molded article according to claim 11, which has a total light transmittance of 90% or more.

13. The molded article according to claim 11, which is an optical plastic film comprising the β-phellandrene polymer in an amount of 50 to 100% by mass, based on the total mass of the optical plastic film, and the β-phellandrene polymer has a glass transition temperature of 80° C. or more and a specific gravity of 0.85 or more and less than 1.0.

14. The molded article according to claim 11, which is a plastic lens comprising the β-phellandrene polymer in an amount of 50 to 100% by mass, based on the total mass of the plastic lens, and the β-phellandrene polymer has a specific gravity of 0.85 or more and less than 1.0 and a total light transmittance of 90% or more.

15. A molded article comprising the β-phellandrene polymer obtained by the method according to claim 6, wherein the amount of the β-phellandrene polymer is 50% by mass or more, based on the total mass of the molded article.

16. The molded article according to claim 11, which has a total light transmittance of 90% or more.

17. The molded article according to claim 11, which is an optical plastic film comprising the β-phellandrene polymer in an amount of 50 to 100% by mass, based on the total mass of the optical plastic film, and the β-phellandrene polymer has a glass transition temperature of 80° C. or more and a specific gravity of 0.85 or more and less than 1.0.

18. The molded article according to claim 11, which is a plastic lens comprising the β-phellandrene polymer in an amount of 50 to 100% by mass, based on the total mass of the plastic lens, and the β-phellandrene polymer has a specific gravity of 0.85 or more and less than 1.0 and a total light transmittance of 90% or more.

19. The β-phellandrene polymer according to claim 1, wherein the amount of the at least one β-phellandrene compound is 80% by mass or more.

20. The β-phellandrene polymer according to claim 1, wherein the amount of the at least one β-phellandrene compound is 90% by mass or more.

* * * * *